United States Patent
Carlier (10) Patent No.: US 9,927,231 B2
(45) Date of Patent: Mar. 27, 2018

(54) SYSTEM AND METHODS FOR DETECTING, MONITORING, AND REMOVING DEPOSITS ON BOILER HEAT EXCHANGER SURFACES USING VIBRATIONAL ANALYSIS

(71) Applicant: Integrated Test & Measurement (ITM), LLC, Milford, OH (US)

(72) Inventor: Timothy M. Carlier, Terrace Park, OH (US)

(73) Assignee: Integrated Test & Measurement (ITM), LLC, Milford, OH (US)

( * ) Notice: Subject to any disclaimer, the term of this patent is extended or adjusted under 35 U.S.C. 154(b) by 306 days.

(21) Appl. No.: 14/670,956

(22) Filed: Mar. 27, 2015

(65) Prior Publication Data

US 2016/0025486 A1    Jan. 28, 2016

Related U.S. Application Data

(63) Continuation-in-part of application No. 14/340,661, filed on Jul. 25, 2014.

(51) Int. Cl.
*B60H 1/00* (2006.01)
*G01B 17/02* (2006.01)
(Continued)

(52) U.S. Cl.
CPC .......... *G01B 17/025* (2013.01); *F28G 3/166* (2013.01); *F28G 9/00* (2013.01); *F28G 15/00* (2013.01); *F28G 15/003* (2013.01)

(58) Field of Classification Search
CPC .......... F28G 9/00; F28G 15/00; F28G 15/003; F28G 3/166; G01B 17/025
(Continued)

(56) References Cited

U.S. PATENT DOCUMENTS 4,475,482 A * 10/1984 Moss ................... G05B 13/021
                                                                122/379
4,669,310 A     6/1987 Lester
(Continued)

FOREIGN PATENT DOCUMENTS

CN        101393119 A      3/2009
DE     102013205645 B3     6/2014
(Continued)

OTHER PUBLICATIONS

International Search Report and Written Opinion issued by the International Searching Authority in corresponding International Patent Application No. PCT/US2015/041067 dated Oct. 30, 2015 (8 pages).

(Continued)

*Primary Examiner* — Len Tran
*Assistant Examiner* — Claire Rojohn, III
(74) *Attorney, Agent, or Firm* — Wood Herron & Evans LLP (57) ABSTRACT

A boiler system includes a boiler having at least one heat exchanger having a surface on which a deposit may form. The boiler system further includes at least one retractable sootblower having a lance tube for carrying a high pressure fluid into the boiler. The lance tube is configured such that the high pressure fluid impacts the heat exchanger surface to effect a vibration in the boiler system. The boiler system also includes at least one vibration measuring device coupled to the boiler system. The vibration measuring device is configured to measure the vibration in the boiler system, and the measured vibration indicates presence or absence of the deposit on the heat exchanger surface. The vibration measuring device may optionally detect a vibration caused by the release of the deposit from the surface of the heat (Continued)

exchanger or the impact of the released deposit with a surface in the boiler system.

15 Claims, 6 Drawing Sheets

(51) Int. Cl.
   *F28G 3/16* (2006.01)
   *F28G 15/00* (2006.01)
   *F28G 9/00* (2006.01)

(58) Field of Classification Search
   USPC .................................................. 165/11.1
   See application file for complete search history.

(56) References Cited

U.S. PATENT DOCUMENTS

| | | | |
|---|---|---|---|
| 4,685,334 A | 8/1987 | Latimer | |
| 5,092,176 A | 3/1992 | Buttram et al. | |
| 5,320,073 A | 6/1994 | Silcott et al. | |
| 5,765,510 A * | 6/1998 | Krowech | F28G 3/16 122/379 |
| 5,769,035 A * | 6/1998 | Fiedler | F22B 37/48 122/379 |
| 5,778,831 A * | 7/1998 | Jameel | B05B 1/34 122/390 |
| 5,925,193 A * | 7/1999 | Bude | F23J 3/00 134/167 R |
| 6,065,528 A * | 5/2000 | Fierle | F28G 1/16 165/5 |
| 6,170,117 B1 * | 1/2001 | Batt | F23J 3/02 122/392 |
| 6,323,442 B1 * | 11/2001 | Jones | F22B 37/56 122/379 |
| 6,325,025 B1 * | 12/2001 | Perrone | F22B 37/56 122/379 |
| 6,425,352 B2 | 7/2002 | Perrone | |
| 6,431,073 B1 * | 8/2002 | Zilka | B08B 7/0007 102/302 |
| 6,470,749 B1 | 10/2002 | Han et al. | |
| 6,575,122 B2 * | 6/2003 | Hipple | F23J 3/023 122/379 |
| 6,715,499 B2 * | 4/2004 | Bartels | F23J 3/023 134/113 |
| 6,736,089 B1 * | 5/2004 | Lefebvre | F23J 3/023 122/379 |
| 6,772,775 B2 * | 8/2004 | Ackerman | F28G 3/16 122/390 |
| 6,782,902 B2 * | 8/2004 | Shover | B05B 7/0884 134/167 R |
| 6,880,402 B1 | 4/2005 | Couet et al. | |
| 6,964,709 B2 * | 11/2005 | Matsumoto | F22B 37/48 134/1 |
| 7,017,500 B2 * | 3/2006 | Jones | F23H 17/00 110/101 CC |
| 7,028,926 B2 * | 4/2006 | Habib | F28G 1/16 122/392 |
| 7,055,209 B2 * | 6/2006 | Zalewski | F23J 3/023 122/390 |
| 7,204,208 B2 * | 4/2007 | Johnson | F22B 37/48 122/379 |
| 7,341,067 B2 | 3/2008 | Jones et al. | |
| 7,584,024 B2 * | 9/2009 | Wroblewski | G05B 13/027 700/300 |
| 7,607,825 B2 | 10/2009 | Koschack et al. | |
| 7,633,033 B2 * | 12/2009 | Thomas | B23K 26/03 219/121.62 |
| 7,735,435 B2 * | 6/2010 | Eriksson | D21C 11/122 110/259 |
| 8,447,431 B2 | 5/2013 | Lefebvre et al. | |
| 9,091,182 B2 * | 7/2015 | Labbe | F01K 7/40 |
| 9,258,495 B2 * | 2/2016 | Zeng | H04N 5/332 |
| 9,374,500 B2 * | 6/2016 | Tsugimura | H04N 1/4092 |
| 9,671,183 B2 * | 6/2017 | Jones | F28G 9/00 |
| 9,709,384 B2 * | 7/2017 | Menn | G01B 11/0625 |
| 2002/0043192 A1 * | 4/2002 | Philippe | D21C 11/12 110/348 |
| 2004/0006841 A1 * | 1/2004 | Jameel | F28G 3/166 15/318.1 |
| 2004/0226758 A1 * | 11/2004 | Jones | F28F 19/00 177/142 |
| 2005/0051112 A1 * | 3/2005 | Van Berlo | F22B 31/045 122/466 |
| 2005/0199743 A1 * | 9/2005 | Hochstein, Jr. | B08B 7/0007 239/67 |
| 2005/0252458 A1 * | 11/2005 | Saviharju | D21C 11/12 122/17.1 |
| 2006/0037399 A1 * | 2/2006 | Brown | G01H 3/12 73/580 |
| 2006/0065291 A1 * | 3/2006 | Jones | F22B 37/48 134/22.1 |
| 2006/0141408 A1 * | 6/2006 | Schiffer | F23J 3/00 431/3 |
| 2006/0236696 A1 * | 10/2006 | Saviharju | D21C 11/12 60/643 |
| 2007/0087311 A1 | 4/2007 | Garvey et al. | |
| 2009/0090311 A1 * | 4/2009 | James | F22B 37/48 122/379 |
| 2009/0151656 A1 * | 6/2009 | Jones | F22B 37/486 122/390 |
| 2010/0064470 A1 * | 3/2010 | Dahlen | B08B 3/02 15/316.1 |
| 2010/0077946 A1 * | 4/2010 | D'Agostini | F01K 3/20 110/345 |
| 2010/0101462 A1 * | 4/2010 | Hayashi | F01K 13/02 110/190 |
| 2010/0107636 A1 * | 5/2010 | Panchatsaram | F01K 13/02 60/661 |
| 2010/0199930 A1 * | 8/2010 | Tandra | F23J 3/023 122/392 |
| 2011/0011315 A1 * | 1/2011 | Hayashi | F23C 9/003 110/345 |
| 2011/0203535 A1 | 8/2011 | Hymel | |
| 2012/0000626 A1 | 1/2012 | Watson | |
| 2012/0270162 A1 * | 10/2012 | Dahlhielm | F23N 1/002 431/12 |
| 2012/0304466 A1 | 12/2012 | Wepfer | |
| 2014/0150825 A1 * | 6/2014 | Hei en | F23J 3/023 134/18 |
| 2015/0007782 A1 | 1/2015 | Medic | |
| 2015/0253003 A1 * | 9/2015 | Jones | F22G 5/02 122/479.1 |
| 2016/0025485 A1 * | 1/2016 | Carlier | F28G 15/00 165/11.1 |
| 2016/0025600 A1 * | 1/2016 | Carlier | F28G 15/02 73/788 |

FOREIGN PATENT DOCUMENTS

| | | |
|---|---|---|
| EP | 1726712 B1 | 3/2010 |
| JP | H05-10564 B2 | 2/1993 |
| JP | 2002-257321 A | 9/2002 |
| WO | 2014068325 A1 | 5/2014 |

OTHER PUBLICATIONS

Japanese Patent Office, Official Action issued in corresponding Japanese Patent Application No. 2017-516746, dated Jul. 14, 2017 ( 2 pages—English translation only).
English Translation of Notice of Preliminary Rejection dated Jul. 20, 2017 from the Korean Intellectual Property Office in corresponding Korean Patent Application No. 2017-7004994 (7 pages).

* cited by examiner

SYSTEM AND METHODS FOR DETECTING, MONITORING, AND REMOVING DEPOSITS ON BOILER HEAT EXCHANGER SURFACES USING VIBRATIONAL ANALYSIS

RELATED APPLICATION

This application is a continuation-in-part of U.S. application Ser. No. 14/340,661, filed Jul. 25, 2014, the disclosure of which is hereby incorporated by reference herein in its entirety.

FIELD

The present invention relates generally to fouling or ash deposits in boilers and, more particularly, to a system and methods for detecting, monitoring, measuring, and/or removing the deposits on heat exchangers of the boilers by using vibrational monitoring and analysis.

BACKGROUND

In the paper-making process, chemical pulping yields black liquor as a by-product. Black liquor contains inorganic cooking chemicals along with lignin and other organic matter that separates from wood during pulping in a digester. The black liquor is burned in a boiler. The two main functions of the boiler are to recover the inorganic cooking chemicals used in the pulping process and to make use of chemical energy in the organic portion of the black liquor to generate steam for a paper mill. As used herein, the term boiler includes a top-supported boiler that burns a fuel that, in the process, fouls heat transfer surfaces.

An example of a boiler used to burn black liquor to generate steam is a Kraft boiler. A Kraft boiler includes banks of heat exchangers at various levels in the furnace for extracting heat by radiation and convection from the furnace gases to generate heated fluids such as steam. Typically, the furnace gases first interact with heat exchangers in a superheater bank to generate superheated steam. The furnace gases then interact with heat exchangers in a generating bank to generate working steam. The generating bank may also be referred to as a boiler bank. Finally, the furnace gases interact with heat exchangers in an economizer bank, which generates lower temperature heated fluids. The banks of heat exchangers are constructed of an array of platens that are constructed of tubes that function as heat exchanger surfaces for conducting and transferring heat. While operating, heat exchanger surfaces are continually fouled by ash generated in the furnace chamber from burning fuels such as black liquor. The amount of fuel that can be burned in a boiler is often limited by the rate and extent of fouling on the surfaces of the heat exchangers. The fouling, including ash deposited on the heat exchanger surfaces, reduces the heat absorbed from fuel combustion, resulting in reduced exit steam temperatures in the fouled heat exchanger banks and high gas temperatures entering the next heat exchanger bank in the boiler. For example, fouling in the superheater bank results in decreased steam temperatures exiting the heat exchanger and increased furnace gas temperature entering the generating bank. The heat exchanger surfaces in the generating bank tend to be relatively narrow compared to the spacing in the superheater and economizer banks, which increases the likelihood of fouling in the generating bank as compared to fouling in the superheater and economizer banks.

Fouling can require a boiler to be shut down for cleaning when either the exit steam temperature is too low for use in downstream equipment or the temperature entering the downstream heat exchanger bank, such as the generating bank downstream from the superheater bank, exceeds the melting temperature of the deposits, resulting in gas side pluggage of the downstream bank. In addition, fouling can eventually cause plugging in the upstream bank as well, such as the superheater bank. In order to remove the plugging from the heat exchanger banks, the burning process in the boiler must be stopped. Kraft boilers are particularly prone to the problem of fouling in the generating bank with ash deposits that must be removed for efficient operation, however the other heat exchanger banks may also become fouled. Three conventional methods of removing ash deposits from the heat exchanger banks in boilers such as Kraft boilers include: 1) sootblowing, 2) chill-and-blow, and 3) water washing. This application addresses only the first of these methods, sootblowing.

Sootblowing is a process that includes blowing deposited ashes off a heat exchanger surface that is fouled with ash deposits using blasts of steam from nozzles of a lance of a sootblower. Sootblowing is performed essentially continuously during normal boiler operation, with sootblowers in various locations in operation at different times. Sootblowing is usually carried out using steam. The steam consumption of an individual sootblower is typically 2-3 kg/s, and as many as four sootblowers may be operated simultaneously. Typical sootblower usage is about 3-7% of the steam production of the entire boiler. Thus, the sootblowing procedure consumes a large amount of thermal energy produced by the boilers being cleaned.

A typical sootblowing process utilizes a procedure known as sequence sootblowing, wherein sootblowers operate at predetermined intervals and in a predetermined order. The sootblowing procedure runs at this pace irrespective of the amount of fouling that may occur at any particular location in the heat exchanger. Often, this leads to plugging in areas of the heat exchanger that are insufficiently cleaned by the predetermined sootblowing sequence that cannot necessarily be prevented even if the sootblowing procedure consumes a high amount of steam. Each sootblowing operation reduces a portion of nearby ash deposits, but ash deposits that are not completely removed may nevertheless continue to build up over time. As ash deposits grow, sootblowing becomes gradually less effective and impairs heat transfer. When an ash deposit reaches a certain threshold where boiler efficiency is significantly reduced or combustion gases cannot be removed from the furnace, deposits may need to be removed by another cleaning process requiring the boiler to be shut down.

SUMMARY

It is desirable to use the total energy of the high pressure steam of the sootblowers to induce vibration in a boiler system, including the vibration of heat exchanger surfaces and sootblowers. The vibration in the boiler system is then used to detect, monitor, measure, and/or remove ash deposits from the heat exchanger surfaces of boilers and, as a result, conserve energy by having the sootblowers use a minimum amount of steam. It is also desirable to develop a map of the ash deposits deposition pattern surrounding each of the sootblowers so that the information in the map may be used to adjust priority of sootblower operations for efficient use and, in general, to develop an effective sootblowing strategy.

An aspect of the invention is directed to a boiler system that includes a boiler having at least one heat exchanger, the at least one heat exchanger having a surface on which a deposit may form. The boiler system further includes at least one retractable sootblower having a lance tube for carrying a high pressure fluid into the boiler. The lance tube is configured such that the high pressure fluid impacts the heat exchanger surface to effect a vibration in the boiler system. The boiler system also includes at least one vibration measuring device coupled to the boiler system, the vibration measuring device being configured to measure the vibration in the boiler system that results from high pressure fluid contacting the heat exchanger surfaces or deposits on the heat exchanger surfaces. The measured vibration of the boiler system indicates presence or absence of the deposit on the heat exchanger surface.

Another aspect of the invention is directed to a method of detecting a deposit on at least one heat exchanger surface of a boiler that includes moving a sootblower lance tube relative to the at least one heat exchanger surface and impacting the at least one heat exchanger surface with steam discharged from the lance tube. The method further includes measuring a vibration at a location in the boiler system caused by the impact of the steam with the at least one heat exchanger surface and analyzing the measured vibration to detect the presence of the deposit at the location.

Another aspect of the invention is directed to methods of mapping the location deposits in a boiler system. The method includes identifying the location of a deposit on a heat exchanger surface based on reactive forces generated by impacting deposits with a high pressure fluid discharged from a sootblower. A deposit map may then be generated based on the positions of the identified deposits.

Another aspect of the invention is directed to a method of detecting a deposit released from a heat exchanger surface in a boiler system. The method includes providing at least one vibration measuring device coupled to the boiler system and detecting a vibration caused by at least one of the release of a deposit from a surface of a heat exchanger or the impact of a released deposit with a surface in the boiler system, the vibration being detected by the vibration measuring device. The method further includes analyzing the detected vibration to determine a location on the surface of the heat exchanger surface from which the deposit was released.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
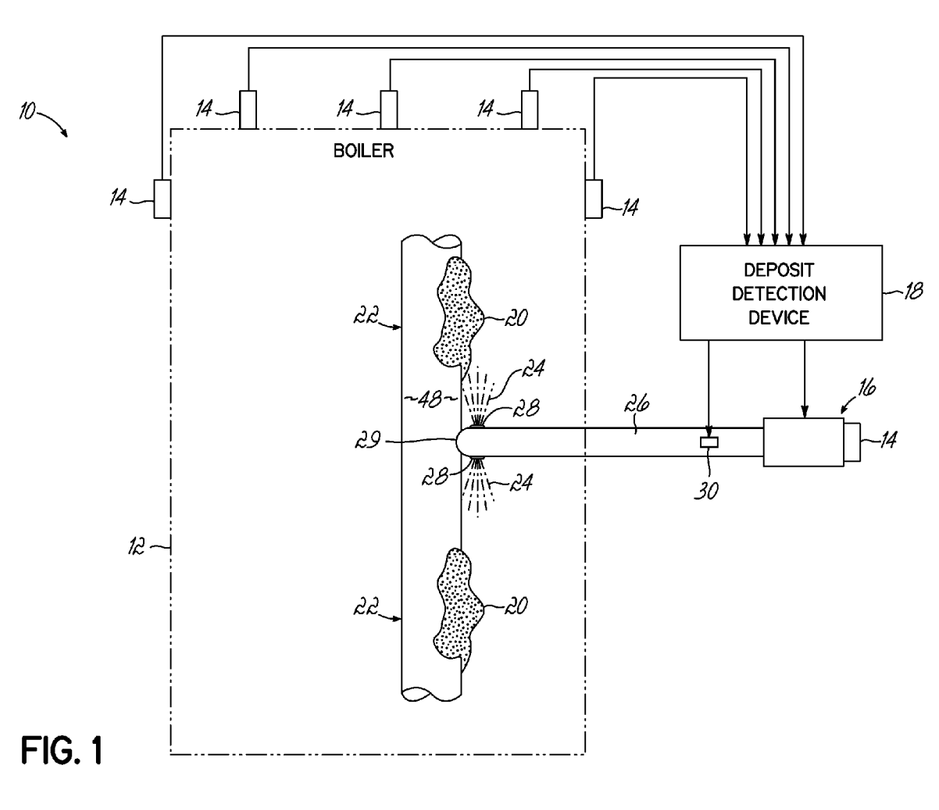
FIG. 1 is a schematic illustration of a boiler system in accordance with an embodiment of the invention.

FIG. 1 is a schematic illustration of a boiler system 10 having a boiler 12 including a plurality of heat exchangers 22 with deposits 20 formed thereupon, one or more vibration measuring devices 14, a sootblower 16, a deposit detection device 18, and an integrated device 30.

For the purposes of the present invention, the term "boiler" 12 refers to a closed vessel in which water or other fluid is heated in heat exchangers that are contacted by hot gases from a combusted fuel. An exemplary boiler 12 is a recovery boiler. The heated or vaporized fluid exits the boiler 12 for use in various processes or heating applications, including boiler-based power generation, process heating, and the like. The term "recovery boiler" includes the type of boiler 12 that is part of the Kraft process of pulping where chemicals for pulping are recovered and reformed from black liquor, which contains lignin (among other organic materials) from previously processed wood. The black liquor is burned, generating heat, which is usually used in the process or in making electricity, much as in a conventional steam power plant. The two main functions of recovery boilers are to recover the inorganic cooking chemicals used in the pulping process and to use the chemical energy in the organic portion of the black liquor to generate steam for the mill. A detailed description of Kraft black liquor boilers are described in detail in U.S. Pat. Nos. 6,323,442 and 7,341,067, which are incorporated by reference herein in their entireties.

Figure 2:
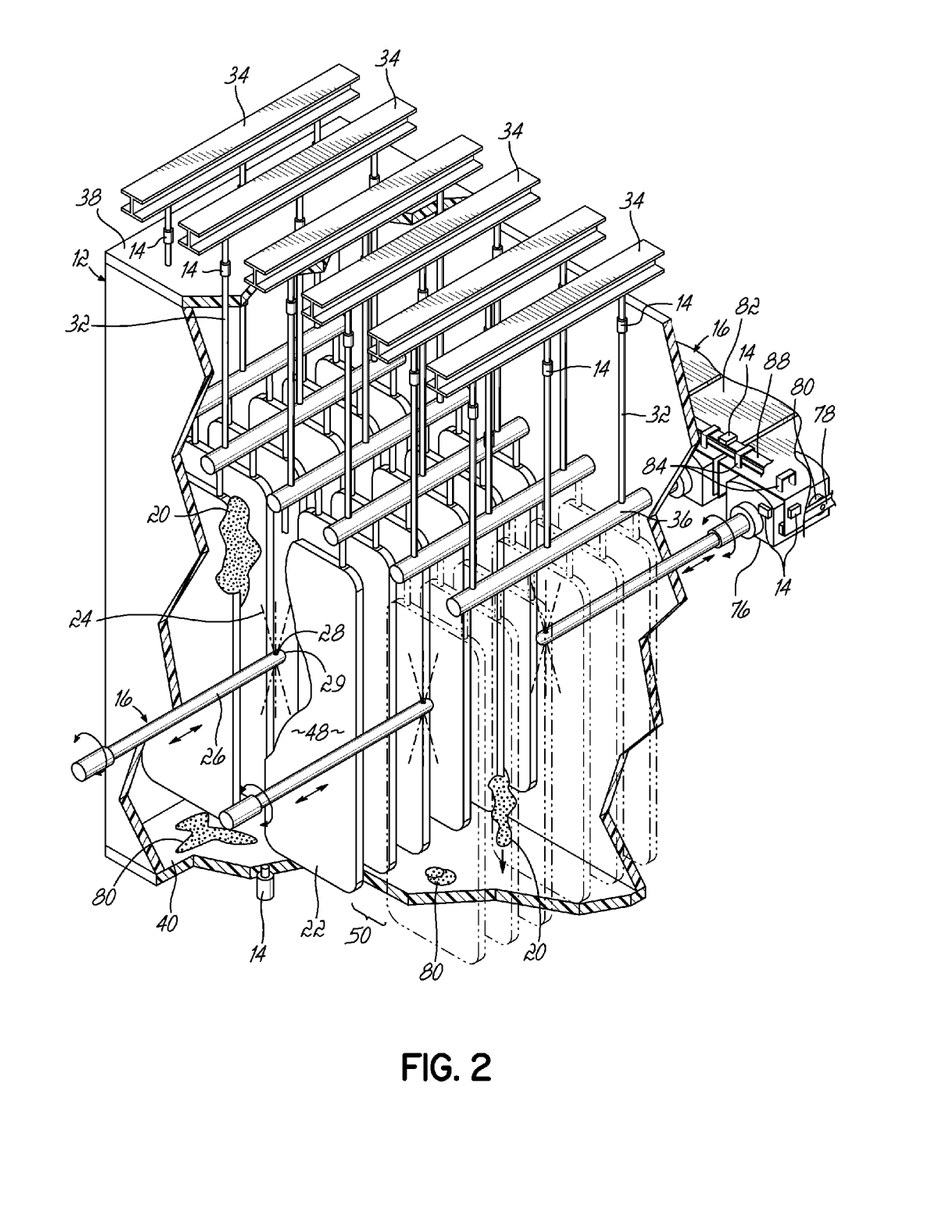
FIG. 2 is an enlarged detail of top perspective view of a portion of the boiler system shown in FIG. 1 illustrating a number of accelerometers positioned on hanger rods supporting a number of platens.
Figure 3:
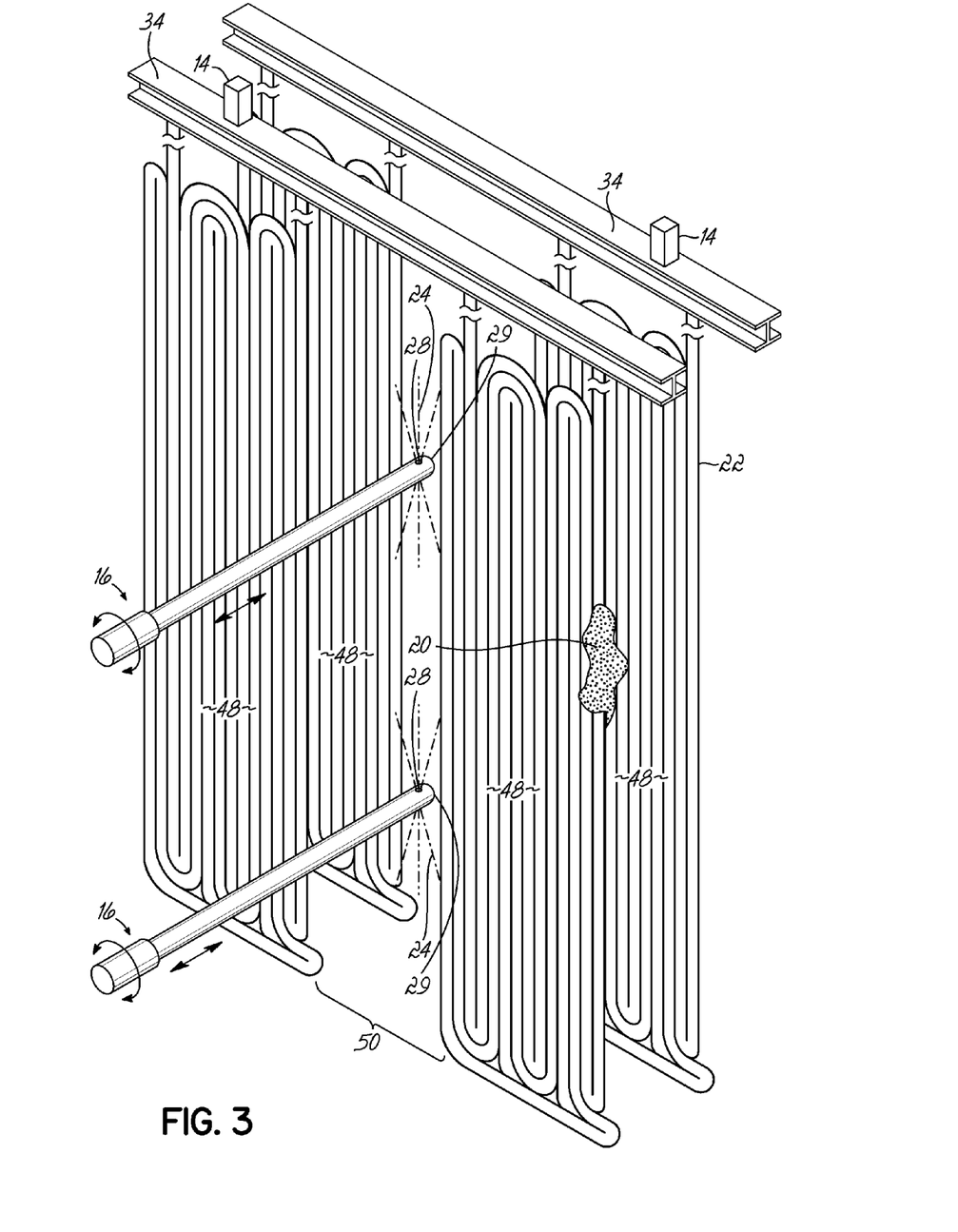
FIG. 3 is a top perspective view of two heat exchanger tubular surfaces, which, for the sake of clarity, are represented by platens in FIG. 2, illustrating two sootblower lance tubes positioned between the heat exchanger tubular surfaces.

With reference to FIGS. 2 and 3, the boiler 12 comprises a series of heat exchangers 22. The heat exchangers 22 may be organized into a superheater bank, a generating bank, an economizer bank, and combinations thereof. The heat exchangers 22 are formed of tubes (FIG. 3) or platens (FIG. 2) having surfaces 48. Each heat exchanger 22 may comprise approximately 20-100 tubes, for example. The heat exchanger surfaces 48 have passages 50 upstream and/or downstream therethrough to allow a sootblower 16 to move relative to the heat exchanger surfaces 48, as will be described in greater detail below.

In an embodiment, the boiler 12 is suspended from a ceiling with boiler supporting structures that may include overhead beams 34 and hanger rods 32. The overhead beams 34 may include I-beams. Approximately 30-100 hanger rods 32 (FIG. 2) may be used to suspend the boiler 12 from the overhead beams 34. More specifically, the hanger rods 32 may be bolted or otherwise coupled to the overhead beams 34 at one end and coupled to the heat exchangers 22 either directly or via headers 36 (FIG. 2) at an opposite end. The hanger rods 32 typically have a diameter that ranges from about 1 inch to about 3 inches and length range from about 2 feet to about 20 feet long.

As explained above during use, slag and/or ash deposits 20 may form on the surfaces 48 of the heat exchangers 22, which degrades thermal performance of the boiler system 10. The amount of the deposit 20 may vary at different locations on the heat exchanger surfaces 48.

The boiler system 10 includes one or more sootblowers 16 for cleaning deposits 20 from the heat exchanger surfaces

48. For example, a boiler system 10 may include a plurality of sootblowers 16 spaced apart by approximately 5-15 feet within the boiler 12. For the purposes of the present invention, the term "sootblower" 16 refers to an apparatus used to project a stream of a high pressure fluid 24, such as steam, air, water or other fluid against heat exchanger surfaces 48 of large-scale combustion devices, such as utility or recovery boilers. Generally, the sootblowers 16 include a lance tube 26 that is in fluid communication with a source (not shown) of high pressure fluid 24, such as steam. As illustrated in FIG. 2, each sootblower 16 may also include a motor 76 for rotating the lance tube 26. The motor 76 is typically suspended from a rail 78 by one or more rollers 80 that couple the motor to a hood 82. The rail 78 allows the motor 76 to move with the lance tube 26 as the lance tube 26 translates in and out of the boiler 12, as described in greater detail below. The hood 82 covers the motor 76 and rail 78 and typically provides at least one attachment point, such as a pair of brackets 84, for coupling the sootblower 16 to an external support structure 88. For drafting efficiency, only a subset of the sootblowers 16 illustrated on FIG. 2 are shown as including motors 76, rails 78, and hoods 82. However, it is appreciated that in embodiments of the invention, all of the sootblowers 16 in a boiler system 10 include these additional structures.

While the sootblowers 16 described herein utilize steam, it is noted that the invention is not so limited, and the sootblowers 16 may also use other high pressure fluids 24. In embodiments of the invention, the high pressure fluid 24 may be supplied at a pressure of approximately 100-400 psi. Each sootblower 16 also includes at least one nozzle 28 at the distal end 29 of the lance tube 26 of the sootblower 16. In an embodiment, each sootblower 16 includes two nozzles 28 that are spaced 180° apart at the distal end 29 of the lance tube 26.

As described in greater detail below, a retractable sootblower 16 is configured such that the lance tube 26 translates (i.e., periodically advance and retract) in and out of an interior of the boiler 12 as the high pressure fluid 24 is discharged from the nozzles 28. The lance tube 26 of the sootblower 16 may also be configured to rotate while the high pressure fluid 24 is discharged from the nozzles 28.

The boiler system 10 also includes one or more vibration measuring devices 14 coupled to the boiler system 10 to measure vibrations in the boiler system 10. Exemplary vibration measuring devices 14 may include an accelerometer, a displacement measurement device, a velocity measurement device and combinations thereof. The vibration measuring devices 14 are mounted on strategic locations in the boiler system 10 such as on the boiler support structure such as on the hanger rods 32 (FIG. 2), on the overhead beams 34 (shown in FIG. 3), or at an exterior surface of the boiler 12 (FIG. 1), such as on a roof 38 of the boiler or in the penthouse (not shown) or on the sootblower 16, such as on the lance tube 26, motor 76, rail 78, hood 82, bracket 84, or external support structure 88. The vibration measuring devices 14 collect vibration data, such as changes in amplitude and natural frequency, of the boiler system 10 such as the vibration of the heat exchanger surfaces 48 or the vibration of the sootblowers 16.

The system also includes a deposit detection device 18 that receives input for the vibration measuring devices 14 and optionally communicates with the integrated device 30 that may control the operation of the sootblower 16. The deposit detection device 18 includes software configured to interpret vibration data received from the vibration measuring devices 14 and to provide instructions to the integrated device 30, so as to direct operation of the sootblower 16 and the lance tube 26.

The sootblowers 16 are periodically operated to clean the heat exchanger surfaces 48 to restore desired operational characteristics. In use, a lance tube 26 of a sootblower 16 moves relative to heat exchanger surfaces 48 through passages 50. The sootblowers 16 are inserted into and extracted from the boiler 12 such that the nozzles 28 move between a first position located outside of the boiler 12 and a second position located inside the boiler 12. As the nozzle 28 on the lance tube 26 of the sootblower 16 move between the first and second positions, the nozzle 28 rotates adjacent the heat exchanger surfaces 48 such that the high pressure fluid 24 is expelled about a radius along the path of the nozzle 28 between the first and second positions. In an embodiment, the second position is the maximum inserted position. The sootblowers 16 move generally perpendicularly to the heat exchanger surfaces 48 as the lance tubes 26 move through the passages 50.

The movement of the sootblower 16 into the boiler 12, which is typically the movement between the first and second positions, may be identified as a "first stroke" or insertion, and the movement out of the boiler 12, which is typically the movement between the second position and the first position, may be identified as the "second stroke" or extraction. Generally, sootblowing methods use the full motion of the sootblower 16 between the first position and the second position; however, a partial motion may also be considered a first or second stroke. The high pressure fluid is usually applied during both the first and second strokes.

As the sootblower 16 moves adjacent to the heat transfer surfaces 48, the high pressure fluid 24 is expelled through the openings in the nozzle 28. The impact of the high pressure fluid 24 with the deposits 20 accumulated on the heat exchanger surfaces 48 produces both a thermal and mechanical shock that dislodges at least a portion of the deposits 20. However, some amount of deposit 20 remains. As used herein, the term "removed deposit" refers to the mass of a deposit that is removed by the sootblowing procedure, and "residual deposit" refers to the mass of a deposit that remains on a heat exchanger surface 48 after a sootblowing cycle.

The impact of the high pressure fluid 24 on the heat exchanger surfaces 48 causes vibration or a change in amplitude and frequency of the heat exchanger surfaces 48, which is detected and measured by one or more of the vibration measuring devices 14. The impact of the high pressure fluid 24 on the heat exchanger surfaces 48 also causes vibration or a change in amplitude and frequency of the sootblower 16, which is detected and measured by one or more of the vibration measuring devices 14. For purposes of the present invention, the term "vibration" refers to a periodic back-and-forth motion of an elastic body or medium. The vibration is usually a result of the displacement of a body from an equilibrium condition, followed by the body's response to the forces that tend to restore equilibrium. The term "amplitude" refers to the maximum absolute value of a periodic curve measured along its vertical axis. The greater the amplitude of the vibration, the greater the energy it carries. The term "frequency" refers to the number of oscillations per second. Natural frequency is the frequency with which a system oscillates in the absence of external forces.

As an amount of deposit 20 buildup changes on the heat exchanger surfaces 48, at least three things happens: 1) frequency of vibrations of the particular heat exchanger surface 48 changes, 2) the frequency of vibrations of the particular sootblower 16 changes, and 3) the amount of pressure applied by the high pressure fluid 24 delivered by the lance tube 26 to that particular heat exchanger surface 48 changes. The vibration of the heat exchanger surface 48, the sootblower 16, or both the heat exchanger surface 48 and the sootblower 16 can be analyzed to detect the presence of residual deposits. In particular, the effect of residual deposits on the amount of excitation energy transferred to the heat exchanger surface 48 by the high pressure fluid 24 can be evaluated as changes in the vibration amplitude or frequency of the heat exchanger surfaces 48. Likewise, the effects of the residual deposits on the amount of excitation energy reacted by the lance tube 26 of a sootblower 16 that results from the high pressure fluid 24 contacting a deposit 20 can be evaluated as changes in the vibration amplitude and/or frequency of vibration measured at the sootblower 16. The amount of energy excitation in the boiler system 10 that results from the high pressure fluid 24 contacting a deposit is a direct function of or directly proportional to the amount of deposit 20 buildup on a heat exchanger surface 48. In other words, increased energy excitation at the heat exchanger surface 48 or lance tube 26, as indicated by changes in the vibration amplitude or frequency measured in the boiler system, signifies an increase in deposit 20 buildup on that heat exchanger surface 48.

The energy transmitted from the high pressure fluid 24 expelled from the lance tube 26 to the heat exchanger surface 48 and/or the sootblower 16 is proportional to the surface area perpendicular to the high pressure fluid flow of a deposit 20 on the heat exchanger surface 48. The surface area of the deposit 20 may correlate to the mass of the deposit 20. The vibrations detected in the boiler system 10 that result from the energy transmitted between the lance tube 26 and deposits 20 on the heat exchanger surface 48 can be used to determine an amount of high pressure fluid 24 the sootblower 16 needs to deliver to remove the deposits 20 from the heat exchanger surface 48. Aspects of the present invention are directed to analyzing the changes in vibration amplitude and frequency responses in the boiler system 10 produced by the forces transmitted to the boiler system 10 by the high pressure fluid 24 expelled from the sootblower 16 contacting deposits 20 on the heat exchanger surfaces 48. Therefore, the concept of energy excitation response is used to determine the location and removal of the deposits 20. The measured vibration may then be used to control a flow characteristic of the high pressure fluid 24, such as an amount of high pressure fluid 24 discharged from the nozzle 28 on the lance tube 26 or a flow rate of the high pressure fluid 24.

An aspect of the invention is directed to methods of mapping deposits 20 on one or more heat exchanger surfaces 48 in a boiler system 10. A deposit map is generally a spatial representation of the location of each sootblower 16 in the boiler 12 and the respective deposit 20 buildup profile as determined by the path of the individual sootblower 16 within the boiler 12. A deposit map may be generated by moving at least one lance tube relative to at least one heat exchanger surface while discharging a high pressure fluid 24. The high pressure fluid 24 impacts deposits on the heat exchanger surfaces resulting in reactive forces in the boiler system 10 that may be measured to identify the presence of a deposit. Thus, by incrementally and simultaneously translating and rotating the nozzle 28 on the lance tube 26 at a set penetration distance into the boiler 12, deposits 20 may be detected at a plurality of locations on the heat exchanger surfaces 48. The position of the nozzle 28 on the lance tube 26 of the sootblower 16 relative to the heat exchanger surfaces 48 when a deposit is identified may then be used to determine the position of identified deposits 20 along the path of the nozzle 28 on the lance tube 26 of the sootblower 16. The position of deposits 20 identified along the path of nozzle 28 of each sootblower 16 may be used to generate a map of deposits 20 at each sootblower 16 location. In an embodiment, the reactive forces are changes in vibration amplitude and frequency measured in the boiler system 10 that are produced by forces transmitted from the sootblower 16 to deposits 20 on the heat exchanger surface 48 by the high pressure fluid 24 or by reactive forces in the sootblower 16 that result from the high pressure fluid 24 contacting a deposit 20 on the heat exchanger surface 48. Other reactive forces in the boiler system indicative of a deposit on the heat exchanger surface may be used to generate deposit maps.

In an embodiment, the map may be represented as a table that identifies the sootblower 16 and the position along the path of the identified sootblower 16 where a deposit 20 is detected. The table may also identify the relative location of the sootblower 16 in the boiler system 10. In another embodiment, the map is a two dimensional representation of one or more deposits 20 on the heat exchanger surfaces 48 along the path of a sootblower 16. In another embodiment, the map is a three dimensional representation of one or more deposits 20 on heat exchanger surfaces 48 along the paths of a plurality of sootblowers. Because a conventional boiler may have, depending on the size, from just a few to more than one hundred sootblowers 16 located across the height and width of the boiler 12, detailed maps of deposits 20 may be obtained. Successive deposit maps may change as the heat exchanger surfaces 48 become fouled or are cleaned and relative changes in deposit 20 build up or position may be illustrated on the successive maps.

The generated maps may assist with identifying areas in the boiler system 10 in which deposits 20 do not form, areas where the sootblowers 16 are adequately removing deposits, and areas where residual deposits remain and that may require additional sootblower 16 activity to remove. These data may be used to develop an efficient sootblowing strategy that reduces steam consumption for energy savings or improves heat exchanger surface 48 effectiveness. For example, a sootblower 16 could be operated in "deposit 20 location mode" periodically, for example, once per day, and the collected information may be used to update a current deposit map. This map may be used to adjust the priority of sootblower 16 operations for effective and efficient use of the sootblower 16 and to reduce steam consumption for energy savings.

Figure 4:
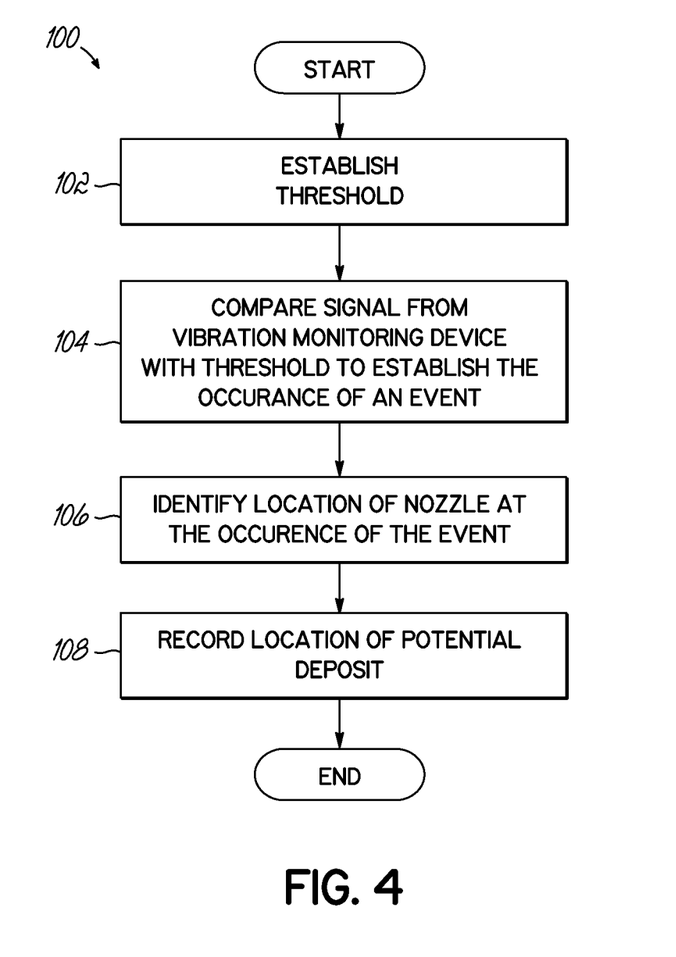
FIG. 4 is a flow chart illustrating a process for analyzing signals from a vibration measuring device to identify the presence of deposits in accordance with an embodiment of the invention.

Referring now to FIG. 4, a flow chart depicting a process 100 for analyzing a signal from a vibration measuring device 14 is presented in accordance with an embodiment of the invention. The analytical process 100 includes a sequence of operations that may be performed by the deposit detection device 18.

In block 102, a threshold for determining the presence of an event indicative of a residual deposit on a heat exchanger surface 48 is established. The threshold is a value or a range of values against which the signal from the vibration measuring device 14 may be compared. In embodiments of the invention, a narrow frequency range of the signal from the vibration measuring device 14 is analyzed for the presence of an event. For example, the threshold may be an amplitude at a given frequency or a calculated root mean squared (RMS) amplitude. In an exemplary embodiment, the threshold is predetermined and can be based on historical data. The historical data can include data taken when the boiler is clean such as just after startup. In an alternative embodiment, the threshold is determined based on real time or near real time data from the vibration measuring device 14. In yet another alternative, the threshold is established as a multiple of the natural frequency or amplitude of the boiler system, and in particular that of the heat exchange surfaces 48 or sootblowers 16.

In block 104, a signal from the vibration measuring device 14 is analyzed for signals that exceed the threshold to establish the occurrence of an event. The signal from the vibration measuring device 14 corresponds to the frequency, the amplitude, or both the frequency and amplitude of the vibration of the boiler system 10 at the location of the vibration measuring device 14. An event may be identified as a signal from the vibration measuring device 14 that exceeds the threshold. In an embodiment, the event is a signal that significantly exceeds the threshold as determined by statistical analysis. In an alternative embodiment, the event is a signal that exceeds the threshold by a predetermined value or percentage.

In block 106, the location of the nozzle 28 is identified at the occurrence of the event. In an embodiment, the location of the nozzle may be identified by recording the time of the occurrence of the event during a stroke of the sootblower 16 and correlating that time with the location of the nozzle 28. Other methods of identifying the location of the nozzle 28 of the sootblower 16 at the occurrence of an event may be employed, such as the use of rotational and displacement measurement sensors.

In block 108, the location of the nozzle at the occurrence of an event is recorded as the location of a potential deposit.

The analytical process 100 set forth in FIG. 4 may be repeated for each stroke of a sootblower 16 into and out of a boiler system. In an embodiment, the location of a potential deposit recorded in a first stroke is compared with the location of a potential deposit recorded in a second stroke. If the location of a potential deposit recorded in a first stroke is near to or the same as the location of a potential deposited recorded in a second stroke, then the presence of a deposit at the location may be considered to be confirmed. In some embodiments, the sootblower 16 does not follow the same helical path on the way into the boiler system as it does on the way out. In such embodiments, a deposit recorded in a first stroke might not be recorded for the second stroke. Additionally, the forces on the sootblower 16 that result from the expelled high pressure fluid during insertion may differ from the forces on the sootblower 16 during extraction. As such, deposits that may be detected in a first stroke might not be detected in a second stroke.

Figure 5:
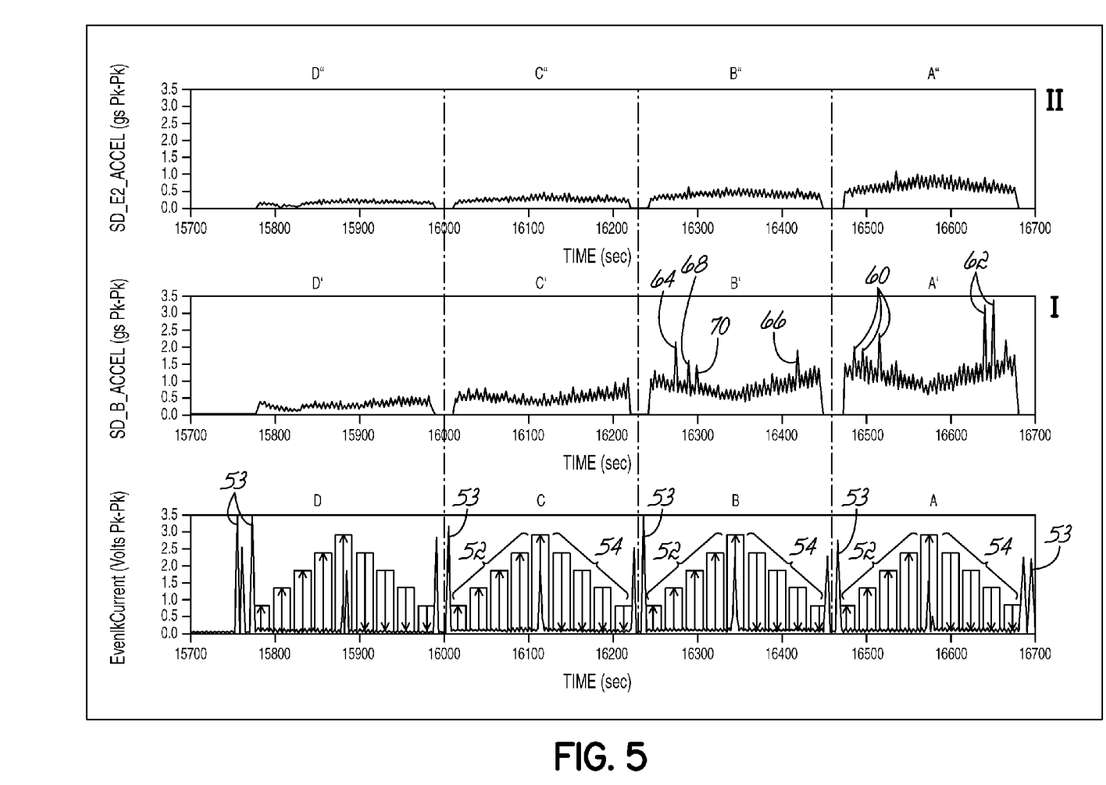
FIG. 5 shows exemplary tracings from data collected from vibration measuring devices located at different positions in a boiler system during the operation of the boiler system in accordance with an embodiment of the invention.

FIG. 5 illustrates exemplary field data collected using two vibration measuring devices 14 at opposite locations (locations I and II) in a boiler system during the operation of four sootblowers (A, B, C, and D). Location I was on the same side of the boiler as the entry point for the sootblowers and location II was on the opposite side of the boiler.

The bottom tracing in FIG. 5 illustrates the electrical current of the motor driving the rotation of the sootblowers 16 during operation. Spikes 53 reflect changes in electrical current of the motor during operation of the sootblowers 16 at regions A, B, C, and D that result from increased resistance required to initiate rotation of the motor. With reference to the data collected from sootblower A, starting at around time 16470 seconds, upward direction of arrows 52 denote the insertion of lance tube 26 in region A between the heat exchangers 48 and downward direction of arrows 54 denote the retraction of the lance tube 26. The height of each arrow 52, 54 denote the relative position of the nozzle 28 of the lance tube 26 inside the boiler 12. For example, the arrow 52 having the shortest height denotes partial insertion of the nozzle 28 and the arrow 52 in the lower panel having the greatest height denotes full insertion of the nozzle 28 into the boiler 12. Similarly, the arrow 54 having the shortest height denotes full retraction of the tip and the arrow 54 having the greatest height denotes full insertion.

The vibration measuring devices 14 at locations I and II measured the movement of the heat exchanger surfaces 48 as changes in amplitude and/or frequency of the heat exchanger surfaces 48 during the movement of the lance tube in the boiler system for the removal and or detection of deposits 20 on the heat exchanger surfaces 48.

Amplitude profile A' illustrates RMS amplitude data over a large frequency range collected by the vibration measuring device 14 at location I during the operation of a sootblower at location A. With the exceptions of a few weak and strong spikes 60, 62, the amplitudes of the profile data are generally consistent in height. The consistent height of the amplitudes indicates that the high pressure fluid 24 being sprayed from the sootblowers 16 is not contacting substantial deposits attached to the surface of the heat exchangers 48, which may be interpreted as meaning that the sootblower 16 is successfully removing the deposits 20 from the surface of the heat exchangers 48. The amplitude data also trends down during the insertion of the sootblower 16 and trends up during extraction. Without being bound by a particular theory, the downward trend suggests that the sootblower 16 is moving away from the vibration detection device 14 and the upward trend suggests that the sootblower 16 moving toward the vibration measuring device 14. The consistent amplitudes detected by the vibration measuring device 14 may be used to establish a real time or near real time threshold. The threshold can also be established as further described above with respect to block 102 in FIG. 4. Amplitude signals that fall below the threshold may indicate that deposits are not building up on the heat exchanger surface 48 or that deposits 20 are being efficiently removed and amplitude signals that exceed the threshold may indicate the presence of a residual deposit 20 on the surface of heat exchanger 48 that has not been efficiently removed. Thus, in an embodiment, the vibration data are analyzed to identify amplitudes that are greater than a threshold indicative of the presence of a deposit 20 on the surface of the heat exchanger 48. Spikes 60, 62 were greater than the threshold, which would indicate the potential presence of a residual deposit on the surface of the heat exchangers.

Spikes 60, 62 may be interpreted as an anomaly resulting from rare occasional sudden impact noise caused by various means such as interaction between the heat exchangers 22 and the sootblowers 16 or a firing rate of the boiler 12. However, spikes 60, 62 occurring repeatedly over a period of time while the nozzle 28 passes through a common location may be indicative of high deposit 20 buildups at the common location. In this case, the spikes 60, 62 indicate that cleaning actions should be directed to those particular locations. When it is determined that a particular location is more prone to the buildup of deposits 20, the operator can schedule cleaning processes with specific sootblowers 16 to routinely clean those locations and, thus, improve the efficiency of the operation of the boiler system 10.

Referring now to vibration amplitude profile A" and the vibration measuring device 14 at location II, as shown in FIG. 5, it can be seen that the amplitude profile A" was relatively consistent, with the exception of a few small spikes. However, an interesting aspect of the amplitude profile A" is that the vibration measuring device 14 at area II was located on an opposite side of the boiler 12 at location A, and therefore, the shape of the profile A" is nearly reversed to that of the profile A'. For example, the amplitude profile A' is concave, while the amplitude or frequency profile A" is convex. The shapes of the amplitude profiles differs because location I of vibration measuring device 14 corresponds to area A of the boiler 12 on the same side of the boiler 12 as the insertion point for the sootblower 16, but the vibration measuring device 14 at location II was on the opposite side of the boiler 12 in area A. The same was true with respect to the sootblowers 16 at locations B, C, and D in the boiler and their respective vibration amplitude profiles (B', B"), (C', C") and (D', D").

In practice, the heat exchangers 22 are divided into several zones, with each zone having a number of sootblowers 16 and vibration measuring devices 14 in communication with one another. The vibration measuring devices 14 in each zone communicate with all of the sootblowers 16 in that zone. This helps to ensure that the vibration signal will be picked up by at least one of the vibration measuring devices 14 in that zone.

Another aspect of FIG. 5 is the presence of strong spikes 64, 66, 68, 70 which may reveal important information to the operator of the boiler 12. At first, these spikes 64, 66, 68, 70 may be interpreted as an anomaly resulting perhaps from an earthquake or sudden impact of an object with the sootblower 16. However, as noted above, when spikes occur repeatedly at the same locations over a period of time during operation of the sootblower 16, the spikes are indicative of high deposit 20 buildups at these particular locations. Assuming that the spikes 64 and 66 are the result of high deposit 20 buildup, a flow characteristic from the nozzle 28 on the sootblower lance tube 26 should be increased at that location to remove the deposits 20. For example, the locations of the heat exchanger surfaces 48 associated with the spikes 64 and 66 may need larger amounts of high pressure fluid 24 to remove the deposits 20, or the high pressure fluid 24 may need to impact the heat exchanger surfaces 48 at those locations with an increased flow rate or with a greater force. In contrast, spikes 68 and 70 each only appear at one time point on the in stroke for the sootblower 16 and do not appear on the out stroke. These data suggest that potential deposits in these two locations are being adequately removed by the existing protocol. These data could also suggest that the path of the sootblower 16 on the in stroke is slightly different from the path of the sootblower on the out stroke and that the deposits identified on the in path are not identifiable on the out stroke.

Figure 6:
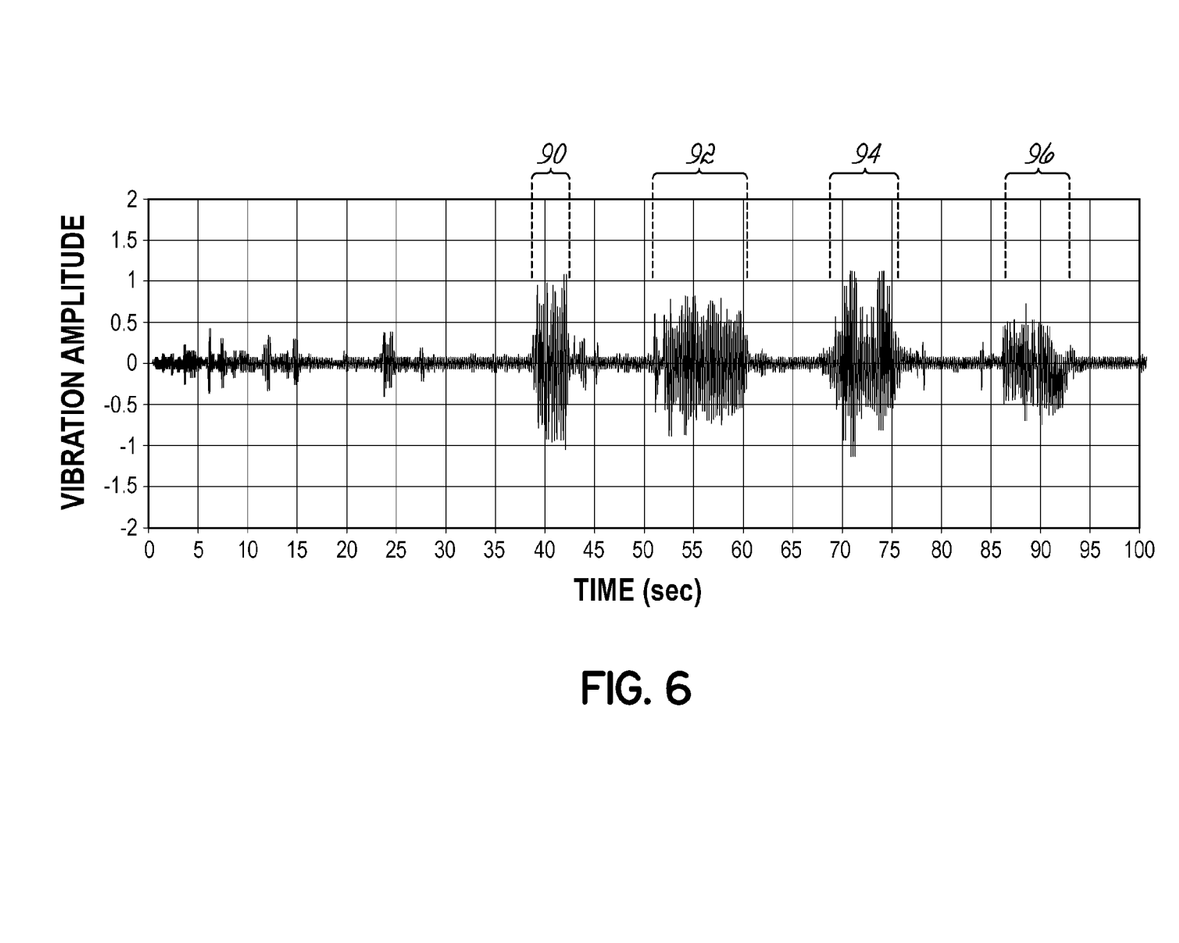
FIG. 6 shows an exemplary tracing from data collected from a vibration measuring device located on a sootblower during the operation of a boiler system in accordance with an embodiment of the invention.

FIG. 6 illustrates exemplary field data collected using a vibration measuring device 14 coupled to a sootblower 16, and in particular, attached to the hood 82 of a sootblower 16 near one of the brackets 84 that attach the sootblower 16 to an external support structure 88. Spikes 90, 92, 94, and 96 indicate the presence of test plates that were attached to the heat exchanger surfaces to simulate deposits. These data were obtained during the insertion stroke of the lance tube 26.

Referring back to FIGS. 4, 5, and 6, it should be noted that the frequency or high pressure fluid output delivered by particular sootblowers 16 may be adjusted in accordance with their respective vibration measurements. By reviewing the vibration differences in the heat exchangers 22 that area associated with individual sootblowers 16, or groups of sootblowers 16, the boiler operator may develop an understanding of locations in the boiler 12 where the most deposit 20 buildup or fouling is occurring. This information may be used to establish the frequency of operation or high pressure fluid output delivered to particular sootblowers 16 for reducing fouling and improving boiler 12 efficiency by using only an amount of high pressure fluid 24 necessary to remove deposits 20. The information may also be used to adjust boiler 12 conditions or configurations to reduce fouling at particular locations. For example, the information may be used to improve the design of the boiler 12 to reduce fouling or to identify locations within the boiler 12 for additional or reduced fouling abatement mechanisms.

The deposit detection device 18 (FIG. 1) receives signals from the vibration measuring devices and may optionally control the operation of the sootblower lance tube 26 based on the deposits 20 located on one or more of the heat exchanger surfaces 48. The deposit detection device 18 also controls the amount of high pressure fluid 24 supplied or the high pressure fluid's 24 flow rate to the heat exchanger surfaces 48 during cleaning portions of the insertion and extraction strokes and during cooling portions of the insertion and extraction strokes when steam is used to keep the sootblower from overheating but not for cleaning purposes. The deposit detection device 18 generally includes a processing unit and a memory device. The deposit detection device 18 may be implemented as a computer (not shown) programmed to carry out the tasks described. The deposit detection device 18 may also be implemented using hardware, software, or combinations thereof. The memory may be encoded with computer readable instructions that cause the processing unit to perform the data analysis described herein.

The deposit detection device 18 may communicate with the integrated device 30, which provides control signals to the sootblower lance tube 26 to start and stop the sootblower 16 strokes. Accordingly, the integrated device 30 may control the frequency of use of each of the sootblowers 16. The integrated device 30 may also provide signals to a data acquisition system (not shown) indicating when individual sootblowers 16, or groups of sootblowers 16, are at particular locations of their strokes. For example, the integrated device 30 may provide a signal to the data acquisition system when a particular sootblower 16 begins a stroke and when the particular sootblower 16 ends its stroke. Furthermore, the integrated device 30 may indicate the insertion and extraction portions of the stroke. The data acquisition system may utilize the signals indicative of the beginning and the end of a particular sootblower 16 stroke to identify vibration measurements from the vibration measuring device 14 occurring at or near the beginning and the end of the sootblower 16 stroke. The deposit detection device 18 may then implement statistical techniques to manipulate the amplitude or frequency data associated with individual sootblowers 16 or groups of sootblowers 16. The vibration characteristics such as the dynamic acceleration, velocity, or displacement data can be used to select a suitable frequency for operation of the sootblowers 16 or a high pressure fluid 24 output of the sootblowers 16.

The data acquisition system generally includes a processing unit and a memory device. The data acquisition system may be implemented as a computer (not shown) programmed to carry out the tasks described. The data acquisition system may also be implemented using hardware, software, or combinations thereof. The memory may be encoded with computer readable instructions that cause the processing unit to perform the data analysis described herein. The data acquisition system may be a standalone device or part of the deposit detection devices 18 or the integrated device 30. In some embodiments, the deposit detection device 18, the integrated device 30, and the data acquisition system are combined in a single unit. It is to be understood that the location and configuration of the deposit detection device 18 and the integrated device 30 are flexible in accordance with general computing technology.

By selecting frequencies or high pressure fluid 24 usage for individual sootblowers 16 or groups of sootblowers 16 based on their measured performance, the overall amount of the high pressure fluid 24 utilized by the sootblowers 16 may be reduced and the effectiveness of the sootblowers 16 improved. This technique can improve the overall efficiency of the boiler 12, which may allow the boiler system 10 to consume less fuel for the same high pressure fluid 24 output or to operate longer without shutdown (scheduled or unscheduled) due to plugging.

With reference back to FIG. 2, in another embodiment, vibration measuring devices 14 may be used to detect release of a deposit 20 from a heat exchanger surface 48. One or more vibration measuring devices 14 are coupled to a boiler 12, for example at a floor 40 of the boiler, on a hanger rod 32, or on a roof 38 of the boiler. The vibration measuring devices 14 may comprise accelerometers, for example. When the deposit 20 grows to a substantial mass, the deposit 20 may release from (or fall off of) the heat exchanger surface 48. This released deposit 80 is commonly referred to as a clinker. When the deposit 20 releases from the heat exchanger surface 48, the vibration of the heat exchanger surface 48 at the location from which the released deposit 80 falls changes, such as from a reactive force in the heat exchanger surface cause by the release of the mass of the deposit from the surface. In this way, when a vibration measuring device 14 coupled to the hanger rod 32 or the boiler roof 38 detects the vibration caused by the released deposit 80, the detected vibration indicates the location from which the released deposit 80 fell. In addition, the greater the vibration measured by the vibration measuring device 14 in response to release of the released deposit 80, the greater the size of the released deposit 80.

Alternatively, a vibration measuring device 14 may detect the vibration of boiler components resulting from impact of the released deposit 80 with the boiler floor 40 or with other structures in the boiler system impacted by the released deposit as it falls. As the released deposit 80 will tend to fall straight down if unobstructed, the vibration measuring device 14 that detects the strongest vibration will indicate a general area of the heat exchanger surfaces 48 from which the released deposit 80 fell.

This embodiment of detecting released deposits 80 may be used separately or in conjunction with the method described above to monitor the accumulation of deposits 20 on the heat exchanger surfaces 48. For example, the presence of released deposits 80 may indicate that a particular location on the heat exchanger surfaces 48 accumulates a deposit 20 more rapidly than other locations on the heat exchanger surfaces 48 or that a particular sootblower 16 is not cleaning as effectively as other sootblowers 16.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method of detecting a deposit on at least one heat exchanger surface disposed within a boiler system, the method comprising:
    operating a sootblower comprising moving a lance tube along a path into and out of a boiler wherein said lance tube includes a rotating nozzle that moves past heat exchanger surfaces in the boiler;
    impacting the heat exchanger surfaces with a high pressure fluid discharged from the lance tube thereby transferring energy from the high pressure fluid to the heat exchanger surfaces and resulting in a vibration in the boiler system;
    measuring the vibration in the boiler system caused by the impact of the high pressure fluid at a plurality of locations on the heat exchanger surfaces, wherein the vibration is measured with a vibration measuring device;
    receiving a signal from the vibration measuring device by a deposit detection device, wherein the signal includes information about the measured vibration;
    analyzing the signal from the vibration measuring device to detect the presence of the deposit at the plurality of locations, wherein the signal is analyzed with a deposit detection device; and
    generating a map of the location of any deposit detected on the heat exchanger surfaces along the path of movement of the lance tube.

2. The method of claim 1, further comprising:
    controlling at least one of a flow characteristic of the high pressure fluid discharged from the lance tube at the location of any deposit detected on the heat exchangers, frequency of operation of the sootblower, or both the flow characteristic and frequency of operation.

3. The method of claim 2, wherein the flow characteristic is selected from the group consisting of an amount of high pressure fluid discharged from the lance tube, a flow rate of the high pressure fluid, and combinations thereof.

4. The method of claim 1, wherein the vibration measuring device is at least one accelerometer coupled to the boiler system.

5. The method of claim 1 wherein the vibration measuring device is coupled to at least one of the soot blower, the boiler, or a boiler supporting structure from which the at least one heat exchangers are suspended.

6. The method of claim 1 wherein the vibration measuring device is coupled to an external surface of the boiler.

7. The method of claim 1, wherein the impacting of the at least one heat exchanger surface with high pressure fluid removes at least a portion of the deposit at the location on the heat exchanger surfaces, the method further comprising:
    measuring a first vibration at a first time point caused by the impact of the high pressure fluid at the location of the heat exchanger surfaces;
    measuring a second vibration at a second time point caused by the impact of the high pressure fluid at the location of the heat exchanger surfaces; and
    comparing the first vibration to the second vibration to determine changes in the amount of the deposit on the heat exchanger surfaces at the location.

8. The method of claim 1, wherein the greater the measured vibration at the location on the heat exchanger surfaces, the greater an amount of the deposit at the location on the heat exchanger surfaces.

9. The method of claim 1, moving a lance tube on a first pass along a path into the boiler, out of the boiler, or both into and out of the boiler; and wherein the analyzing step includes comparing the signal with a threshold and in response to the vibration exceeding a threshold, determining the existence of a deposit on the heat exchanger surfaces.

10. The method of claim 9, further comprising:

identifying the position of the lance tube when the signal exceeds the threshold; and determining a position of the deposit on the heat exchanger surfaces based on the position of the lance tube when the signal exceeds the threshold.

11. The method of claim 9 further comprising:

moving a lance tube on a second pass subsequent to the first pass; and wherein the analyzing step includes comparing the signal with a threshold and in response to the vibration exceeding a threshold, determining the existence of a deposit on the heat exchanger surfaces.

12. The method of claim 11, further comprising:

determining a position of the deposit on the heat exchanger surfaces identified in the first pass;

determining a position of the deposit on the heat exchanger surfaces identified in the second pass; and comparing the position of the deposit from the first pass with the position of the deposit from the second pass.

13. The method of claim 12, further comprising comparing the first signal with the second signal if the position of the deposit from the first pass overlaps with the position of the deposit from the second pass, wherein a difference between the first and second signals indicates a change in mass of the deposit on the heat exchanger surfaces.

14. The method of claim 1 wherein the vibration measuring device is coupled to the sootblower.

15. The method of claim 14 wherein the vibration is measuring device is couple to sootblower lance tube, a sootblower motor, a sootblower rail, a sootblower hood, a sootblower bracket, a sootblower external support structure, or combinations thereof.

\* \* \* \* \*

UNITED STATES PATENT AND TRADEMARK OFFICE
CERTIFICATE OF CORRECTION

| | |
|---|---|
| PATENT NO. | : 9,927,231 B2 |
| APPLICATION NO. | : 14/670956 |
| DATED | : March 27, 2018 |
| INVENTOR(S) | : Timothy M. Carlier |

It is certified that error appears in the above-identified patent and that said Letters Patent is hereby corrected as shown below:

In the Drawings

Fig. 4, Box #104, "OCCURANCE" should be --OCCURRENCE--.

In the Specification

Column 4, Line 35, "are described" should be --is described--.

Column 6, Line 12, "move between" should be --moves between--.

Column 8, Line 44, "example, once" should be --example once--.

Column 9, Line 38, "potential deposited" should be --potential deposit--.

Column 9, Lines 63-67, each instance of "denote" should be --denotes--.

Column 10, Line 30, "sootblower 16 moving" should be --sootblower 16 is moving--.

Column 11, Line 6, "profiles differs" should be --profiles differ--.

Column 11, Line 63, "area associated" should be --are associated--.

Column 13, Line 30, "cause by" should be --caused by--.

In the Claims

Claim 5, Column 14, Line 48, "exchangers are" should be --exchanger is--.

Signed and Sealed this
Thirtieth Day of April, 2019

Andrei Iancu
*Director of the United States Patent and Trademark Office*

Claim 9, Column 15, Line 1, "claim 1, moving" should be --claim 1, further comprising moving--.

Claim 15, Column 16, Line 16, "vibration is measuring device" should be --vibration measuring device--.